US00RE50884E

(19) United States
(12) Reissued Patent
Schneider

(10) Patent Number: US RE50,884 E
(45) Date of Reissued Patent: May 12, 2026

(54) HOODED NECK PILLOW WITH ADJUSTABLE FACE COVERING

(71) Applicant: Chase Schneider, Orlando, FL (US)

(72) Inventor: Chase Schneider, Orlando, FL (US)

(73) Assignee: CCS Creations LLC, Orlando, FL (US)

(21) Appl. No.: 17/581,309

(22) Filed: Jan. 21, 2022

Related U.S. Patent Documents

Reissue of:
(64) Patent No.: 10,863,826
Issued: Dec. 15, 2020
Appl. No.: 15/724,363
Filed: Oct. 4, 2017

(51) Int. Cl.
*A47C 7/38* (2006.01)
*A47G 9/10* (2006.01)

(52) U.S. Cl.
CPC ..... *A47C 7/383* (2013.01); *A47G 9/1081* (2013.01); *A47G 9/1045* (2013.01)

(58) Field of Classification Search
CPC ..... A47G 9/1081; A47G 9/1045; A47C 7/36; A47C 7/383; A47C 7/386; A61F 9/04; A41D 12/11; A41D 12/1184
See application file for complete search history.

(56) References Cited

U.S. PATENT DOCUMENTS 945,839 A * 1/1910 Brisbane ..... A61F 13/124 2/206
1,309,042 A * 7/1919 Milkes ..... 2/84
1,380,480 A * 6/1921 Jennings ..... A47C 7/383 5/490
2,367,459 A * 1/1945 Corley ..... A42B 1/12 2/172
2,413,828 A * 1/1947 Hirsh ..... A47G 9/10 5/639
3,538,508 A * 11/1970 Samuel ..... A42B 3/00 2/205
3,651,847 A * 3/1972 Casamassima ..... A47G 9/1045 383/14
3,780,379 A * 12/1973 Kampman ..... A61F 13/124 2/15
3,840,918 A * 10/1974 Shave ..... A47G 9/1036 5/640
5,546,604 A * 8/1996 Geller ..... A42B 1/046 2/202
5,713,077 A * 2/1998 Humbrecht ..... A42B 1/0182 2/202
6,363,554 B1 * 4/2002 Brown ..... A47G 9/0253 5/490
6,397,395 B1 * 6/2002 DeHart ..... A41D 3/005 2/202

(Continued)

FOREIGN PATENT DOCUMENTS

FR 2963544 A3 * 2/2012 ..... A47G 9/007
JP 2003334131 A * 11/2003 ..... A47C 7/383

*Primary Examiner* — Sarah B Mcpartlin
(74) *Attorney, Agent, or Firm* — Brian S. Steinberger; Hilary F. Steinberger; Steinberger IP Law

(57) ABSTRACT

The present invention provides a means to block light while resting, in particular, in a public environment such as on airplanes. A U-shaped neck pillow has a detachable hood. Attached to the inside of the hood near the face opening is a deployable face covering. The face covering is air permeable and has an interior pouch thereon for the removable placement of filters.

3 Claims, 9 Drawing Sheets

(56) References Cited

U.S. PATENT DOCUMENTS

| | | | | |
|---|---|---|---|---|
| 6,425,138 | B1 * | 7/2002 | Johnson | A42B 1/045 2/202 |
| 6,651,256 | B1 * | 11/2003 | Swift | A47G 9/10 2/202 |
| 7,657,954 | B1 * | 2/2010 | Bunkers | A47C 7/383 5/639 |
| 8,550,548 | B2 * | 10/2013 | Gibbons | A47D 13/027 297/184.13 |
| 8,887,333 | B2 * | 11/2014 | Cohen | A47C 27/081 5/639 |
| 8,990,980 | B1 * | 3/2015 | Hindley | A47C 7/383 5/639 |
| 9,522,084 | B2 * | 12/2016 | Wilson | A61F 9/04 |
| 9,526,360 | B2 * | 12/2016 | Sternlight | A47G 9/10 |
| 9,566,885 | B2 * | 2/2017 | Gazit | B60N 2/4805 |
| 9,661,884 | B2 * | 5/2017 | Yarahmadi | A41D 23/00 |
| 9,751,438 | B2 * | 9/2017 | Dunham | B60N 2/882 |
| 10,863,826 | B1 * | 12/2020 | Schneider | A47G 9/1081 |
| 10,918,229 | B1 * | 2/2021 | Mello | A47G 9/04 |
| 11,457,676 | B2 * | 10/2022 | Pagan | A41D 13/1161 |
| 2005/0160514 | A1 * | 7/2005 | Flaniken | A41D 3/005 2/84 |
| 2010/0229275 | A1 * | 9/2010 | Wilson | A61F 9/04 2/9 |
| 2012/0144590 | A1 * | 6/2012 | Sharp | A47C 7/383 5/639 |
| 2013/0125312 | A1 * | 5/2013 | Harooni | A47C 7/383 5/639 |
| 2014/0000036 | A1 * | 1/2014 | Cohen | A47C 27/081 5/639 |
| 2014/0007351 | A1 * | 1/2014 | Cohen | A47G 9/0253 5/639 |
| 2015/0082546 | A1 * | 3/2015 | Sternlight | A47C 7/383 5/639 |
| 2015/0257538 | A1 * | 9/2015 | MacDougall | B60N 2/882 297/217.1 |
| 2015/0314715 | A1 * | 11/2015 | Kilgore | A47C 7/383 5/636 |
| 2015/0352988 | A1 * | 12/2015 | Knapp | B60N 2/882 297/393 |
| 2016/0213959 | A1 * | 7/2016 | Barklow | A41D 13/1107 |
| 2017/0224033 | A1 * | 8/2017 | Latta, Jr. | A41D 15/04 |
| 2018/0310731 | A1 * | 11/2018 | Staton | A47G 9/0253 |
| 2018/0360242 | A1 * | 12/2018 | Doty | A47C 7/383 |

* cited by examiner

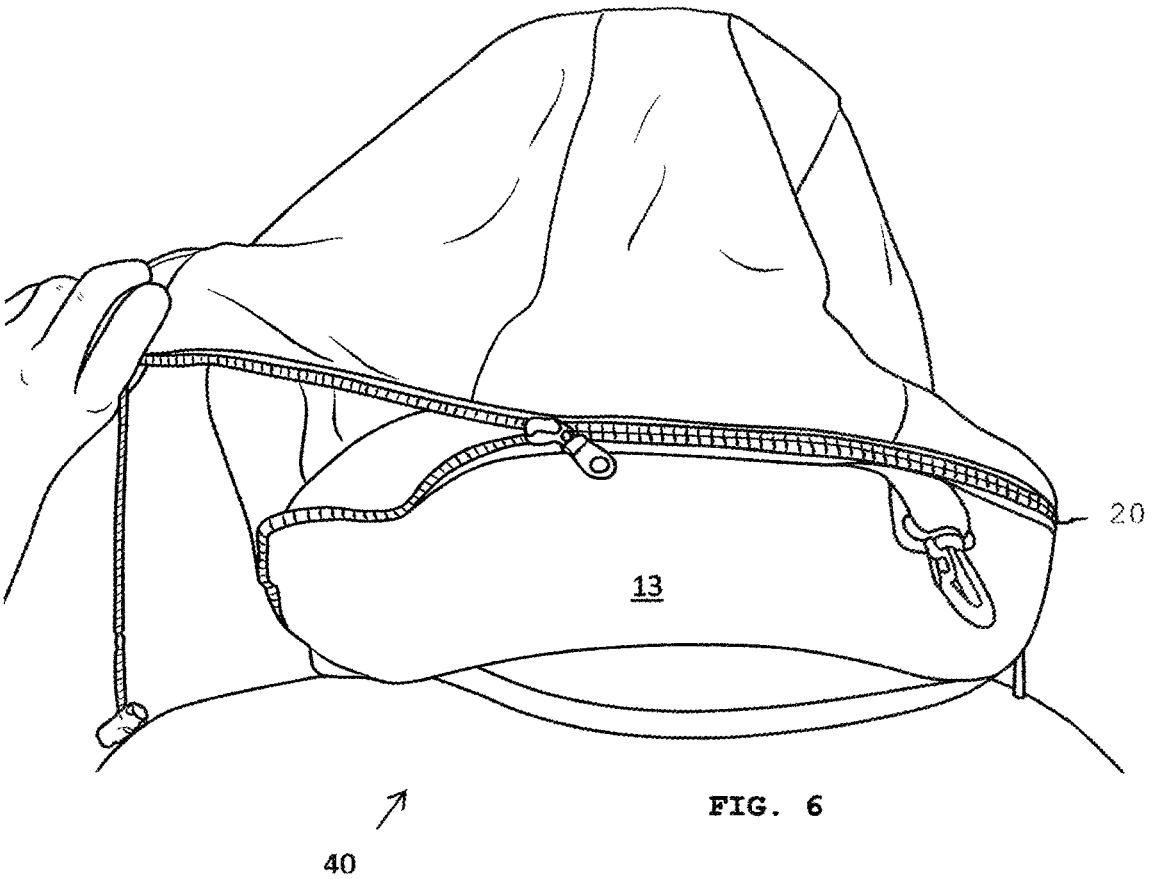
FIG. 6
FIG. 10
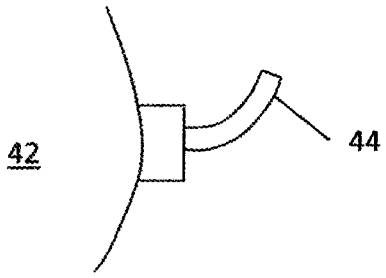

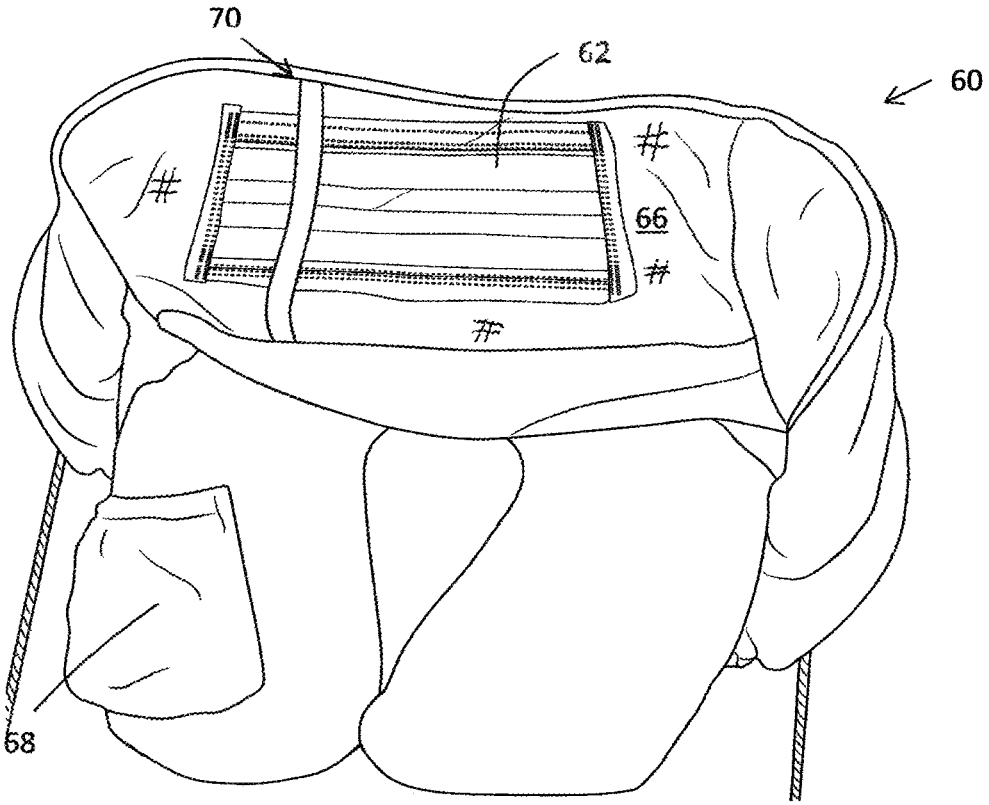
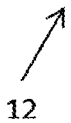
FIG. 8
FIG. 12
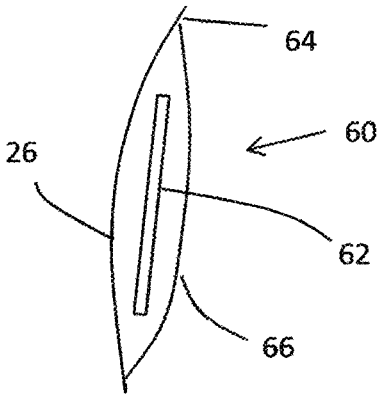

HOODED NECK PILLOW WITH ADJUSTABLE FACE COVERING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to sleeping aids, and, more particularly, relates to pillows with head covers, and, in greater particularity, relates to devices for blocking the entrance of light for aiding in sleeping or resting in environments where light control is impossible.

Description of the Prior Art

People desire to sleep and/or rest in a darkened area, but in the past, many areas could not be darkened like that in an airplane or in other public places.

For example, in an airplane, people can be reading next to you, or looking at their smart devices, or talking to people around them, or children may be uncontrollable to the point where resting is almost impossible. The surrounding overhead lights may be annoying and even open windows allow light to enter that one cannot control. One can attempt to block the light by wearing sun glasses or even putting a blanket over one's head, but this may not be sufficient.

One patented invention is noted in U.S. Pat. No. 7,657,954 where an extended hood, FIG. 1, is attached to a neck pillow that can be pulled down over the face as shown in FIG. 8. The prior art identified is incorporated by reference.

Accordingly, a device is needed to allow a person to darken or block light for the purpose of resting.

SUMMARY OF THE INVENTION

The present invention provides a means to block light while resting, in particular, in a public environment such as on airplanes. A U-shaped neck pillow has a detachable hood. Attached to the inside of the hood near the face opening is a deployable face cover. The face cover is air permeable and has an interior pouch thereon for removable placement of filters.

An object of the present invention is to provide a means for blocking light while resting in a public environment.

It is another object of the present invention to provide a means for blocking light that further functions as a filter to remove germs and other particles during use.

It is a further object of the present invention to provide a means for blocking light that is transportable and easily stored.

It is still a further object of the present invention to provide a means for blocking light, but also reduces sounds.

It is still another object of the present invention to provide a means for blocking light and that reduces sound that is child friendly having pictures or other symbols thereon.

These and other objects, features, and advantages of the present invention will become more readily apparent from the attached drawings and the detailed description of the preferred embodiments, which follow.

BRIEF DESCRIPTION OF THE DRAWINGS

FIG. 6 is a back side perspective view showing the hood being separated from the neck pillow by a joining zipper;

FIG. 8 is a top frontal perspective view of the filter being inserted into a pouch on the inside of the hood;

FIG. 10 shows a partially inflated bladder;

FIG. 12 shows a partial cross sectional view through a pouch with a filter therein.

Like reference numerals refer to like parts throughout the several views of the drawings.

DETAILED DESCRIPTION OF THE PREFERRED EMBODIMENTS

The present invention provides a means to block light while resting, in particular, in a public environments such as on airplanes.

In general, a U-shaped neck pillow has a detachable hood. Attached to the inside of the hood near the face opening is a deployable face covering. The face covering is *shown in FIG. 12 as a single contiguous line, the face covering 26 is an ambient light blocking material that is* air permeable like a screen and may have an interior pouch thereon for the removable placement of filters.

Figure 1:
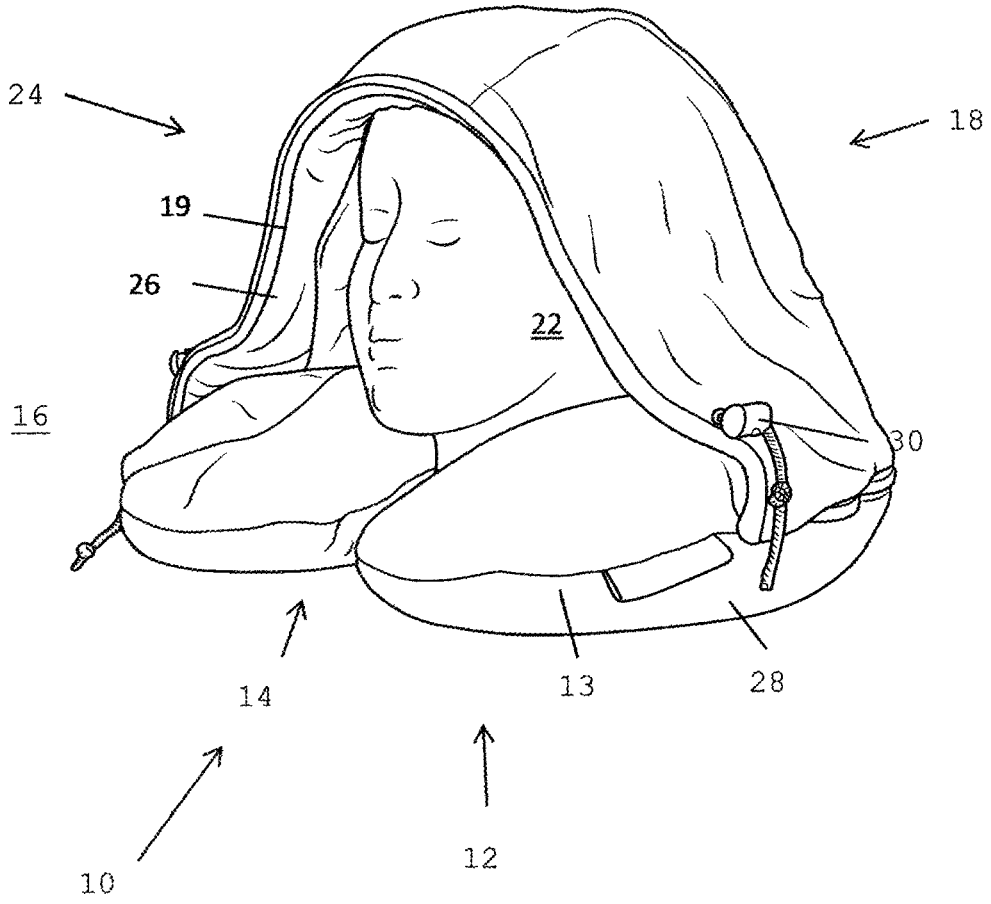
FIG. 1 is a frontal perspective view of a device being a neck pillow with an attachable hood*, and rolled up face covering which exposes the forehead, eyes, nose, mouth and all of the chin of the user:*

Referring to FIG. 1, a frontal perspective view of a device 10 for reducing exterior conditions such as light, noise, smells, dust, etc., comprises a neck pillow 12 being U-shaped with an opening 14 in a front side 16. The pillow 12 may also be inflatable for storage. The pillow 12 may have a pillow cover or case 13 thereon to insure that it may be cleaned by washing and reattached. When referring to the pillow 12, the cover or case 13 is included. A removable hood 18 is removably attached by a zipper 20 or other conventional means such as hook and loop, FIG. 6, to the neck pillow 12 or to the pillow cover 13 on the outer edge. As seen in FIG. 1, the removable hood 18 partially covers a head 22 of a user 24. A deployable face covering 26 is attached to the inside of the removable hood 18. As seen in FIG. 1, the face covering 26 is rolled up on the inside edge of the hood 18 for storage in a pouch-like device 19 running around the inside edge of the hood 18. Further, the hood 18 may be stored in the pillow cover 19 having essentially the same shape as the pillow 12, but used as storage of the hood 18. See FIG. 2 of the Bunkers patent cited above and incorporated herein showing the pillow cover called a housing 12. Further, to prevent unrolling when not in use, a hook and loop means 17 may be attached between the face covering 26 and the hood 18. The neck pillow 12 may comprise a U-shaped pillow insert, not shown, but of conventional materials and is Placed inside of the U-shaped pillow cover 28. Further the pillow insert may be an inflatable bladder 42, FIG. 10, and may be removed through a closable opening 40, FIG. 6. A pull cord 30 may be used to reduce the exposed area about the face 22 and is of conventional design traveling through a channel in the hood 18. Further, all of the materials shown are fabric or fabric-like materials like plastics unless otherwise stated.

Figure 2:
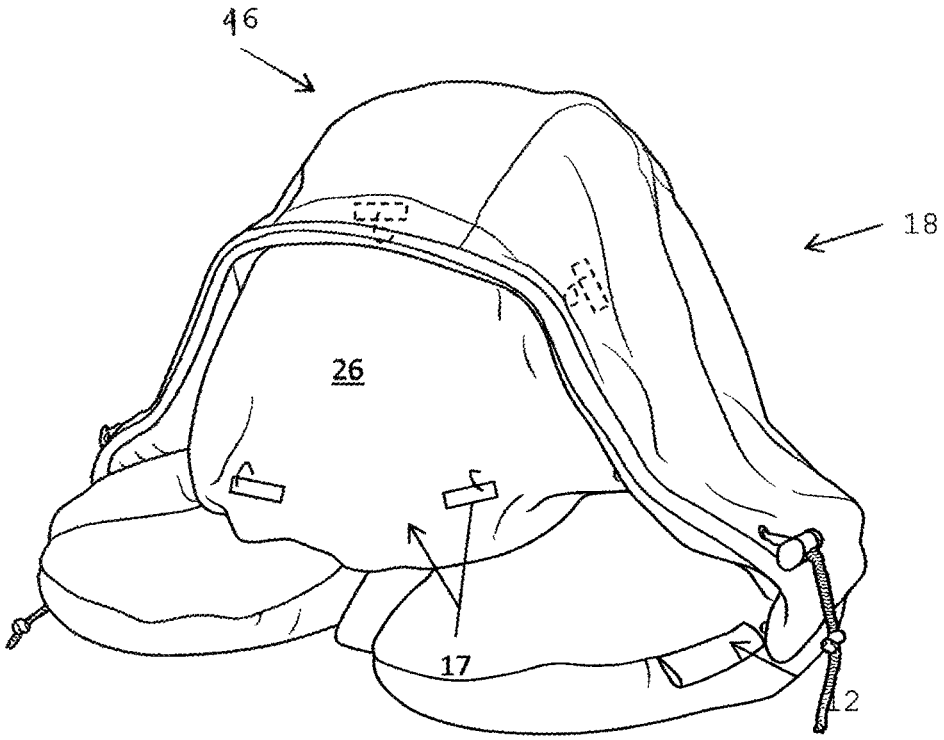
FIG. 2 is a frontal perspective view like FIG. 1 with a deployable face covering pulled down.
Figure 3:
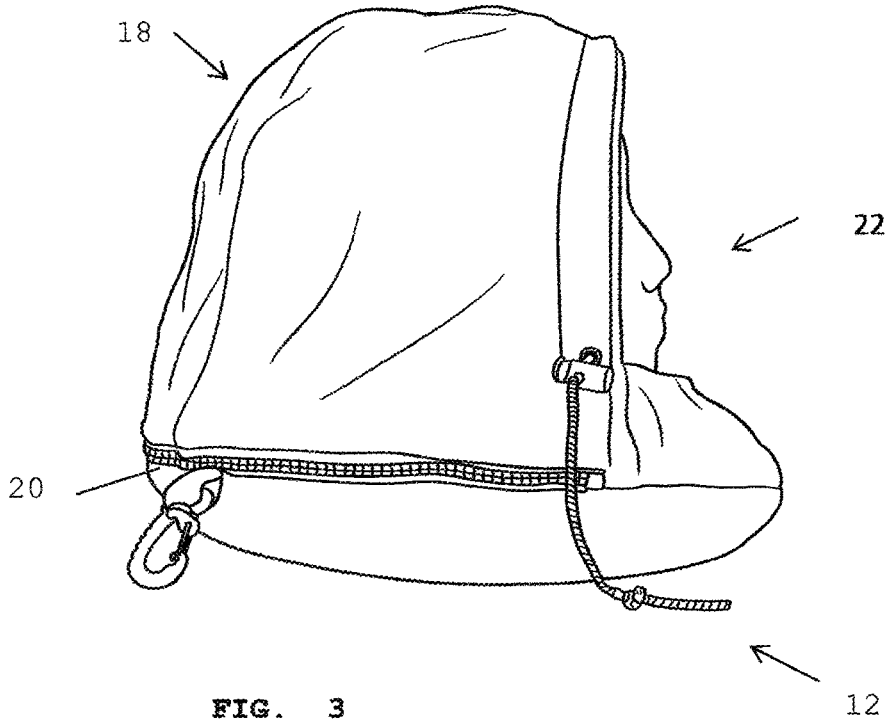
FIG. 3 is a side perspective view like FIG. 1.
Figure 4:
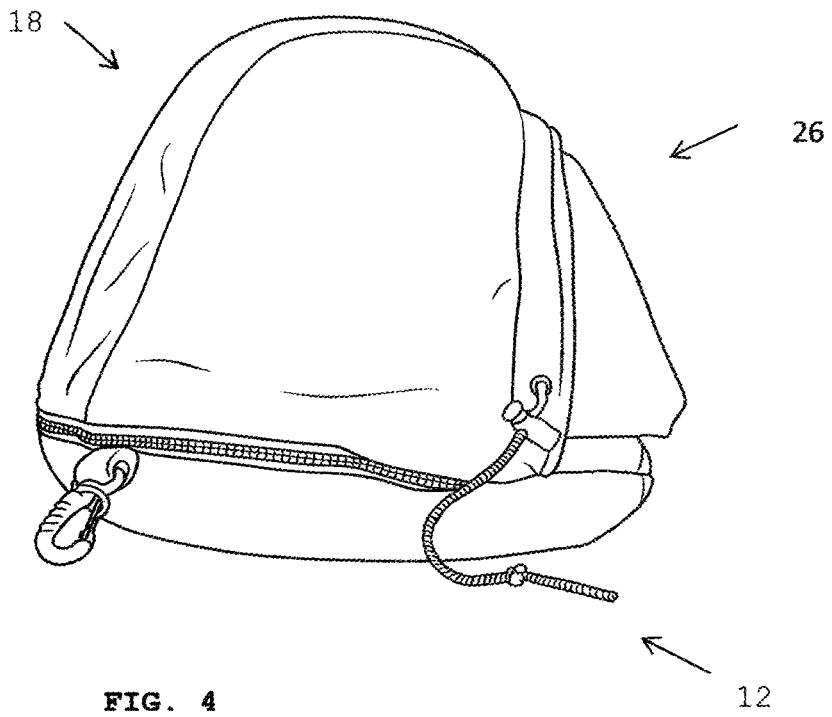
FIG. 4 is a side perspective view like FIG. 3 with a deployable face covering pulled down.
Figure 5:
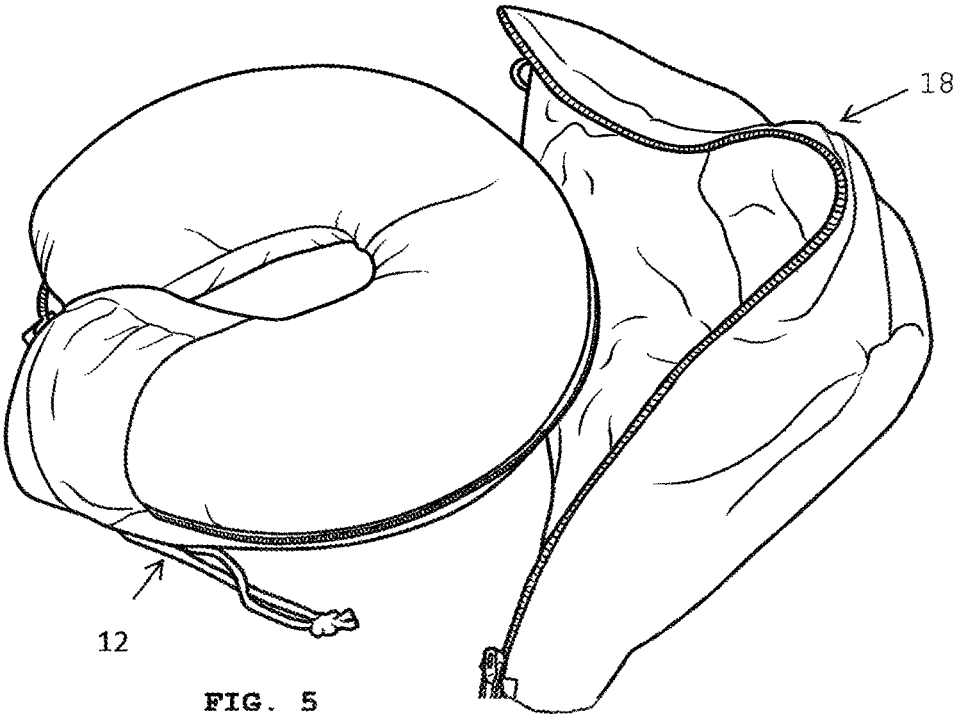
FIG. 5 is a top perspective view of the neck pillow separated from the hood.
Figure 7:
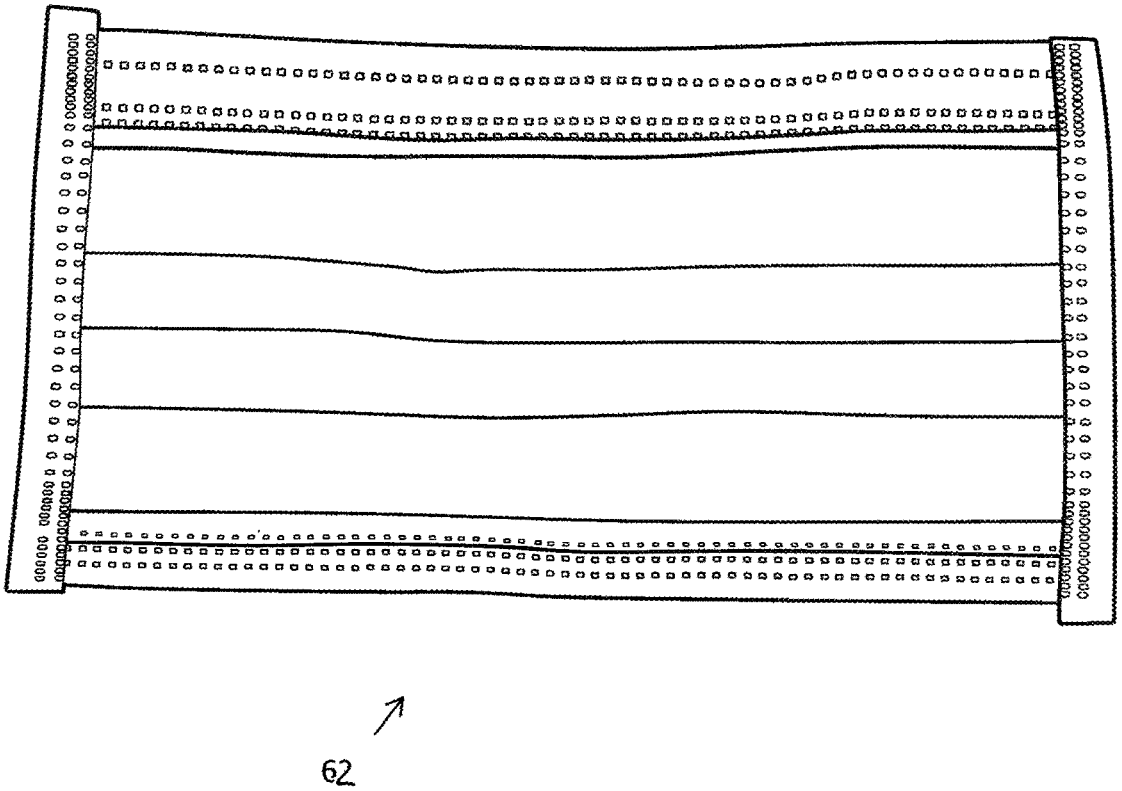
FIG. 7 is a frontal view of a filter that can be used on the deployable face covering.

FIG. 2 is a frontal perspective view like FIG. 1 with the deployable face covering 26 pulled down. The neck pillow insert may be made of conventional pillow material, not shown, or be a bladder Further, the pillow insert may be an inflatable bladder 42 having essentially the same shape as the pillow cover 13 but smaller, partially shown in FIG. 10, with an inflation hose 44 being of conventional design. The bladder 42 may be inserted into the pillow cover 13 through the opening 40 and then inflated. This feature would allow the device 10 to be carried in a purse, a bag, a brief case, a backpack, etc., until it is needed. FIG. 3 by side view shows the neck pillow 12, and hood 18 zippered onto the pillow 12. FIG. 4 shows the face covering 26 pulled down. FIG. 5 shows the neck pillow 12 separated from the hood 18.

*Referring to FIGS. 3, 4 and 6 a spring latch hook is shown attached to an outer mid rear portion of the neck pillow.*

Although the face covering 26 is air permeable, vent holes 46, FIG. 2, *located* in the top of the hood 18 will further allow hot air to escape.

Figure 11:
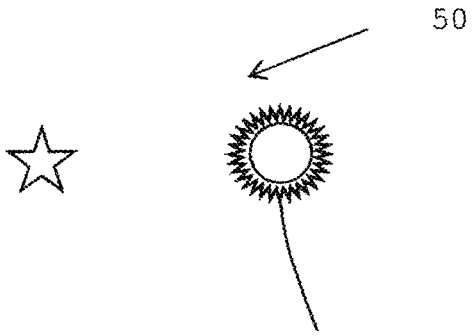
FIG. 11 shows several different Pictures of symbols, flowers, etc., that can be attached to the exterior surface.

For children, the exterior surface of the face covering 26 or the hood 18 may be covered with one or more pictures 50 of animals, symbols, flowers, etc., FIG. 11. Further the device 10 may come in a variety of sizes for both adults and children as well as a variety of colors.

The device 10 may further include *but not require* a pouch 60, FIG. 8 and FIG. 12, on an inside surface 64 of the deployable face covering 26 covering a substantial area thereof. The outer surface 66 of the pouch 60 may be of very light material, screening, or netting, as shown by "X"ing in FIG. 8.

Figure 9:
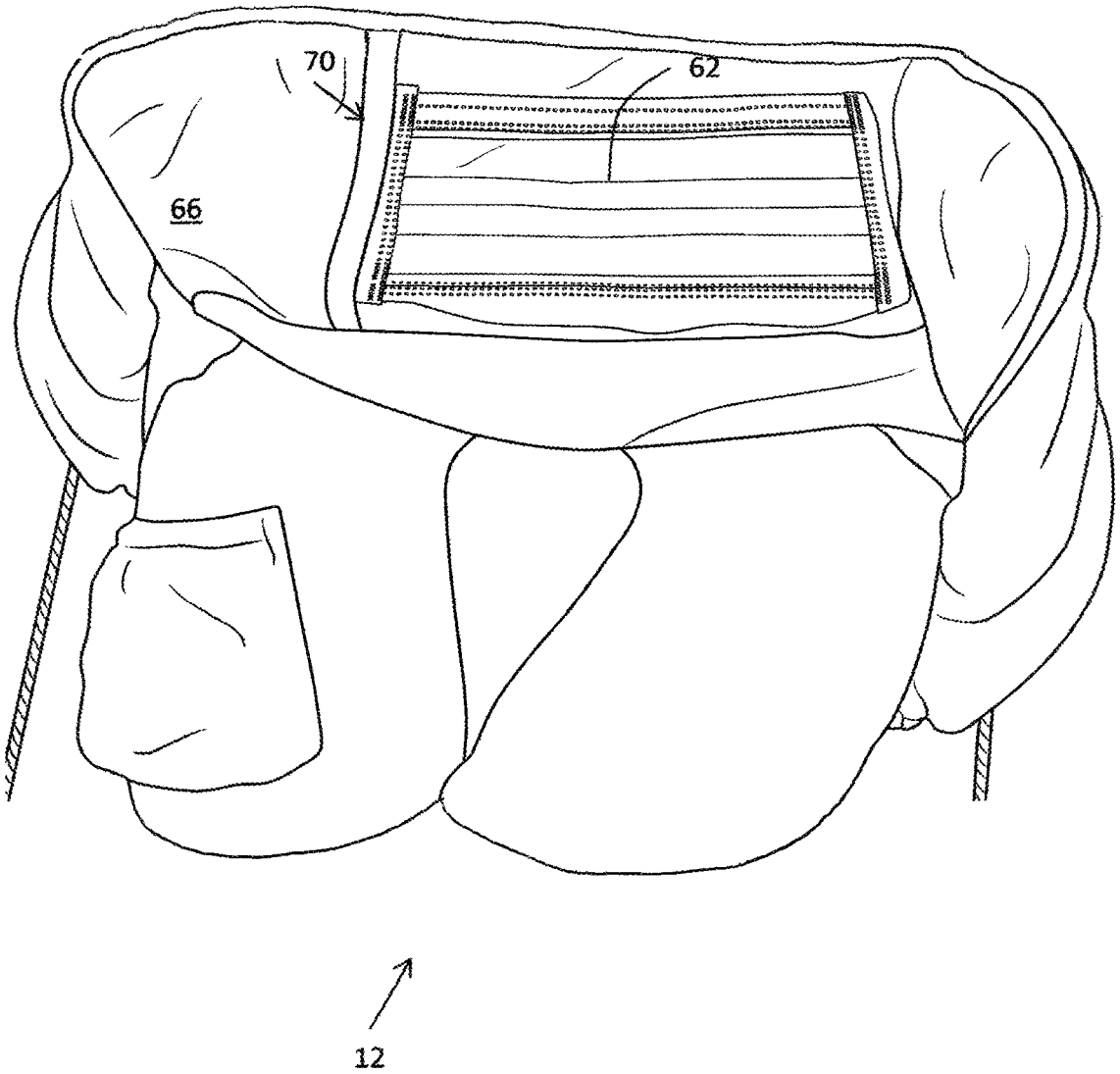
FIG. 9 is a top frontal perspective view as FIG. 8 where the filter is enclosed within a pouch on the inside of a deployable face covering.

FIG. 8 shows the pouch 60 having a filter 62, therein and is further shown in FIG. 12 in cross section. *FIG. 12 shows a partial cross sectional view through a pouch 60 with a filter 62 therein. In FIG. 12, face covering 26 is shown as a single contiguous line that extends above and below outer surface 66 of the pouch 60 with the filter 62 separately spaced between the face cover 26 and the outer surface 66 of the pouch 60. As previously referenced, the outer surface 66 of the pouch 60 may be of very light material, screening, or netting, as shown by "X" ing in FIG. 8.* The user 24 when breathing draws air through the filter 62 which may include a charcoal material to catch germs and particles. The filter 62 may be carried in an additional pouch 68, FIG. 8, on the neck pillow 12 and when removed is inserted through an opening 70 in a pouch [in] *formed on the inside surface 64 of* the face covering 26 *by screen/netting 66 (further shown in FIG. 12)*. FIG. 9 shows the filter 62 fully inserted into the pouch.

*The additional pouch 68 in FIG. 8 and FIG. 9 is on a front facing surface of one leg of the neck pillow 12. The additional pouch 68 has an upper horizontal opening into the additional pouch 68. The horizontal opening being substantially perpendicular to a longitudinal axis along the one leg of the neck pillow 12.*

*Referring to FIGS. 3, 4 and 6, a latch hook can be attached to a portion of the neck pillow 12.*

A method of blocking ambient light during resting uses the device 10 wherein the neck pillow with a hood and a deployable face covering thereon is attached about a neck of a user; the hood is deployed over the head of the user; and then the face covering is pulled down. The face covering may include a filter screen in a pouch on the deployable face covering before deploying.

Since many modifications, variations, and changes in detail can be made to the described embodiments of the invention, it is intended that all matter's in the foregoing description and shown in the accompanying drawings be interpreted as illustrative and not in a limiting sense. Thus, the scope of the invention should be determined by the appended claims and their legal equivalents.

What is claimed is:

1. A device for controlling external environmental conditions comprising:

a neck pillow, said neck pillow having an opening in a front side being capable of having a neck of a user inserted therein;

a removable hood *comprising a fabric material*, said removable hood removably attached to said neck pillow *by a zipper or a hook and loop means*, said removable hood being capable of partially covering a head of the user and having an opening for the face of the user; and a deployable face covering [wherein] *comprising an ambient light blocking and an air permeable material that allows the user to breathe through the air permeable material, an upper end of* said deployable face covering attached to said removable hood, wherein said deployable face covering is attached about an interior edge of said hood, said deployable face covering is capable of being rolled up upon itself for storage when not in use on an inside of said hood, *the rolled up face covering capable of exposing forehead, eyes, nose, mouth and all of the chin of the face of the user*; wherein said deployable face covering is attached to an interior edge of said inside of said hood; further including a pouch *formed* on an inside surface of said deployable face covering *by a screen or netting that forms an outer surface of the pouch, wherein a bottom end of the deployable face covering pulled down is capable for blocking ambient light to the forehead, eyes, nose, mouth and chin of the face of the user*; and further including a filter screen that is adaptable for use in said pouch, *further including*

*a pull cord about the opening in the removable hood for reducing exposure for the face of the user; and further*

*including a channel in the hood for allowing the pull cord to travel therethrough, further including*

*an additional storage pouch on a front face of one leg of the neck pillow, the additional pouch has an upper horizontal opening into the additional pouch, the horizontal opening being substantially perpendicular to a longitudinal axis along the one leg of the neck pillow, and further including;*

*a latch hook attached to a portion of the neck pillow; and*

*hook and loop means attached between the face covering and the removable hood to prevent unrolling of the face covering when the face covering is not being used.*

2. A device for controlling external environmental conditions comprising: a neck pillow, said neck pillow having an opening in a front side being capable of having a neck of a user inserted therein; a removable hood *comprising a fabric material*, said removable hood removably attached to said neck pillow *by a zipper or a hook and loop means*, said removable hood being capable of partially covering a head of the user and having an opening for the face of the user; and a deployable face covering *comprising an ambient light blocking and an air permeable material that allows the user to breathe through the air permeable material*, said deployable face covering attached to said removable hood, wherein *an upper end of* said deployable face covering is attached about an interior edge of said hood, said deployable face covering is capable of being rolled up upon itself for storage when not in use on an inside of said hood; [wherein said deployable face covering is attached to an interior edge of said inside of said hood;] *wherein the deployable face covering rolled up is capable of exposing forehead, eyes, nose, mouth and all of the chin of the face of the user, wherein an end of the deployable face covering pulled down is capable for blocking ambient light to the forehead, eyes, nose, mouth and chin of the face of the user;* further including a pouch *formed* on an inside surface of said deployable face covering *by a screen or netting*; and further including a filter screen having a carbon material for filtering particles, *further including*

*a pull cord about the opening in the removable hood for reducing exposure for the face of the user; and further including a channel in the hood for allowing the pull cord to travel therethrough, further including*

*an additional storage pouch on a front face of one leg of the neck pillow, the additional pouch has an upper horizontal opening into the additional pouch, the horizontal opening being substantially perpendicular to a longitudinal axis along the one leg of the neck pillow, and further including;*

*a latch hook attached to a portion of the neck pillow; and*

*hook and loop means attached between the face covering and the removable hood to prevent unrolling of the face covering when the face covering is not being used.*

3. A method of blocking ambient light during resting, said method comprising the steps of:

attaching a neck pillow with a *removable* hood with a deployable face covering therein about a neck of a user, *the removable hood attached to the neck pillow by a zipper or a hook and loop means, the face covering comprising an ambient light blocking and an air permeable material that allows the user to breath through the air permeable material*;

deploying said *removable* hood over a head of the user; and deploying the deployable face covering *for blocking ambient light from the forehead, eyes, nose and mouth of the face of the user, the face covering capable of being rolled up exposing forehead, eyes, nose, mouth and all of the chin of the face of the user*;

further including a step of placing a filter screen in a pouch *formed* on *an inside surface of* the deployable face covering *by a screen or netting,* before deploying *the face covering;*

*providing a pull cord about the opening in the removable hood for reducing exposure to the face of the user;*

*providing a channel in the removable hood for allowing the pull cord to travel therethrough;*

*providing an additional storage pouch on a front face of one leg of the neck pillow, the additional pouch has an upper horizontal opening into the additional pouch, the horizontal opening being substantially perpendicular to a longitudinal axis along the one leg of the neck pillow;*

*attaching a latch hook to a portion of the neck pillow; and*

*providing hook and loop means attached between the face covering and the hood to prevent unrolling of the face covering when the face covering is not being used.*

* * * * *